United States Patent [19]

Mozelev et al.

[11] Patent Number: 5,736,636
[45] Date of Patent: Apr. 7, 1998

[54] PROBE FOR RADIOLOGICALLY DETERMINING THE DENSITY OF ROCK IN A DRILLED WELL

[75] Inventors: Alexander Alexeevich Mozelev; Vladimir Ivanovich Kravtsov, both of Moscow, Russian Federation; Michael Maurer, Biederitz, Germany; Wolfgang Voigt, Gommern, Germany; Jaanus Krabi; Andreas Schaale, both of Berlin, Germany

[73] Assignee: BBI Gesellschaft für Brunnen u. Bohrlochinspektion mbH, Gommern, Germany

[21] Appl. No.: 661,082

[22] Filed: Jun. 10, 1996

[30] Foreign Application Priority Data

Jul. 3, 1995 [DE] Germany ............ 195 24 119.3

[51] Int. Cl.⁶ .................................................. E21B 49/00
[52] U.S. Cl. .......................... 73/152.05; 73/152.14
[58] Field of Search ...................... 73/152.05, 152.06, 73/152.07, 152.14, 152.15, 152.17

[56] References Cited

U.S. PATENT DOCUMENTS

| | | | |
|---|---|---|---|
| Re. 31,074 | 11/1982 | Notle | 73/151 |
| 3,801,816 | 4/1974 | Arnold | 250/270 |
| 4,169,979 | 10/1979 | Arnold et al. | 250/266 |
| 4,210,813 | 7/1980 | Romanovsky et al. | 250/421 |
| 4,387,302 | 6/1983 | Givens | 250/270 |
| 4,845,359 | 7/1989 | Wraight | 250/254 |
| 5,086,224 | 2/1992 | Roscoe et al. | 250/269 |
| 5,122,662 | 6/1992 | Chen et al. | 250/269 |
| 5,390,153 | 2/1995 | Scherbatskoy | 367/83 |

Primary Examiner—Elizabeth L. Dougherty
Assistant Examiner—Max H. Noori
Attorney, Agent, or Firm—Karl Hormann

[57] ABSTRACT

A probe for determining the density of the material forming the wall of a wellhole provided with a selectively actuable source of gamma radiation pulses, including a pulse electron accelerator having an anode and cathode in axial alignment with a control electrode therebetween, the anode being connected to the output of the secondary coil of a Tesla transformer the primary coil of which is connected to the output of a capacitive high voltage charge unit. Emitted and scattered radiation are measured by first and second detectors the outputs of which are fed to a divider to derive a quotient of the outputs as a value representative of the density.

17 Claims, 1 Drawing Sheet

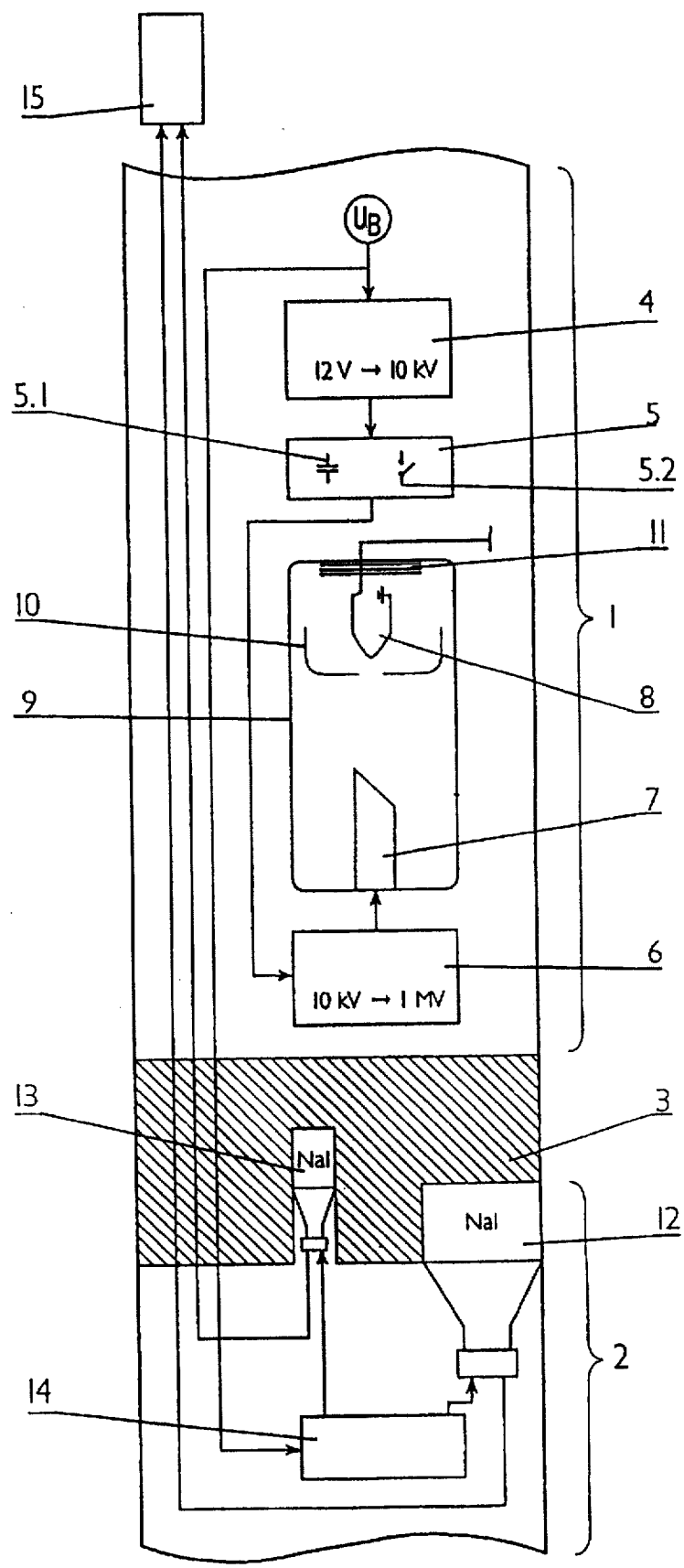

PROBE FOR RADIOLOGICALLY DETERMINING THE DENSITY OF ROCK IN A DRILLED WELL

BACKGROUND OF THE INVENTION

1. Field of the Invention

The present invention relates to a probe for insertion into a drilled well or wellhole for determining the density of rock forming the wall of the well, by gamma radiation.

2. Discussion of the Prior Art

For determining the density of rock as well as for examining lithological formations, it is known to insert a probe into a wellhole which emits defined gamma radiation and which detects the intensity of the gamma radiation scattered by the material of the wall of the wellhole. Values representative of the density of the wall material of the wellhole or of the lithological formations are derived on the basis of the absorption of the emitted gamma radiation. If necessary, recourse may be had to comparative measurements of known materials. This method is known in the trade as gamma-gamma-log.

Hitherto, naturally radioactive substances such as, for instance, $^{137}Cs$ have been used as sources of gamma radiation; see, for example, German Patent 3,312,883 or U.S. Pat. No. 4,845,359. The considerable safety precautions which have to be observed in the handling of such radioactive materials increasingly lead to excessive costs. Moreover, if lost in a wellhole, the recovery of such natural radiation sources, may result in unpredictable costs and risks.

As described in U.S. Pat. No. 5,122,662, attempts have been made to utilize a circular magnetic induction accelerator (betatron) as a source of gamma radiation. Electrons are cyclically accelerated in a circular orbit and, upon reaching a predetermined energy, they were emitted and converted into gamma radiation. During the acceleration, strong magnetic fields generated by electromagnets are required to maintain the electrons in their circular or spiral orbit and thereby realize a plurality of acceleration cycles. Until they have reached a sufficient acceleration, the electrons remain in the accelerator for a relatively long time. A vacuum meeting high demands must be created in order to prevent the electrons from interacting with matter in the accelerator during this time. Because of their complicated or complex structure, high energy consumption and demanding vacuum technology, inductive circular accelerators are expensive to operate. Furthermore, for providing gamma radiation of sufficient intensity, the dimensions and, more particularly, the diameter of such accelerators cannot be kept compact, so that their usability in connection with wellholes of small diameter is limited. To the extent they can be used at all in wellholes of small diameter, the results of measurements are either only of low statistical correctness, or the measurements require very long measuring times. Moreover, it is difficult to dissipate the heat generated by the high energy required to generate the magnetic fields in the accelerator.

OBJECTS OF THE INVENTION

It is, therefore, an object of the invention to provide a relatively simple probe for radiologically determining the density of rock wall material of wellholes and which may be utilized in a vast range of applications.

Another object of the invention is to provide a probe of the kind referred to which does not require extensive safety precautions.

Yet another object of the invention is to provide a probe of the kind referred to which avoids the high potential of danger or hazard of prior art devices.

It is also an object of the invention to provide a probe of the kind referred to which is inexpensive to manufacture.

It is an object of the invention to provide a probe of the kind referred to which is inexpensive to operate.

Moreover, it is an object of the invention to provide a probe which does not require naturally radioactive material for its operation.

A further object is to provide a probe of the kind referred to which is of simple construction.

An important object of the invention is to provide a probe of small cross-sectional dimensions.

Still further, it is an object of the invention to provide a probe which requires relatively small amounts of energy for its operation.

Finally, it is an object of the invention to provide a probe of the kind referred to in which a vacuum can be maintained without elaborate technology.

Other objects will in part be obvious and will in part appear hereinafter.

BRIEF SUMMARY OF THE INVENTION

In the accomplishment of these and other objects, the invention, in a preferred embodiment thereof, provides for a probe for radiologically determining the density of the material of the wall of a wellhole, comprising a gamma radiation generator comprising a linear pulse electron accelerator, a detector unit shielded from the gamma radiation generator and comprising a main detector and a control detector, and a divider, the main detector being arranged to receive radiation scattered by the material surrounding the wellhole and the control detector being arranged directly to receive a predetermined portion only of the radiation generated by the gamma radiation generator, the outputs of the main and control detectors being connected to first and second inputs of the divider. Preferably, the linear pulse electron accelerator comprises a capacitive energy storage connected to a high voltage charge unit, the output of the energy storage being connected to the primary coil of a Tesla transformer the secondary coil of which is connected to an anode. A heatable cathode is preferably arranged opposite the anode along the longitudinal axis of the probe, and the surface of the anode facing the cathode intersects the longitudinal axis of the probe at an angle of about 45°. Preferably, a control electrode is arranged intermediate the anode and the cathode. The control detector is preferably arranged within the shield such that it only receives gamma radiation proportional to the generated gamma radiation pulse.

The linear pulse electron accelerator preferably comprises a Tesla transformer for generating the high voltage pulses necessary for producing the gamma radiation. The primary coil of the Tesla transformer is connected to a capacitive energy storage and a discharger. The capacitive energy storage is preferably connected to a high voltage charging unit. The high voltage output of the Tesla transformer is connected to an anode opposite which a heatable cathode is arranged along the longitudinal axis of the probe. The high voltage charging unit serves to charge the capacitive energy storage to a predetermined state before it is discharged to produce a high $\delta I/\delta t$ in the primary coil of the Tesla transformer. The high voltage pulse thus generated by the Tesla transformer and applied between anode and cathode extracts electrons from the heated cathode and accelerates them to the anode where they impact and by their deceleration generate a pulse of gamma radiation. Preferably, the surface of the anode facing the cathode is disposed at an angle of 45° relative to the longitudinal axis of the probe. In this manner, the major portion of the intensive gamma radiation pulse produced is deflected toward the wall of the wellhole. Here, it impacts on the material forming the wall of the wellhole and is scattered or partially absorbed thereby. A small portion of the gamma radiation pulse directly reaches a control detector which generates a control measuring signal in proportion to the intensity of the gamma radiation pulse. A main detector which is shielded from the gamma radiation source registers the intensity of the scattered radiation pulse. The outputs of both detectors are connected to inputs of a divider. Consequently, any variations in the intensity of the gamma radiation pulses cannot affect the result of the measurement. This is true also of the effect of variations induced by temperature or pressure on the characteristic curves of the detector unit. Depending upon the depth of the wellhole and geological conditions such variations may be considerable indeed. The divider may either be arranged within the probe, or it may be located outside of the wellhole. Alternatively, the divider may be simulated by software functioning like a divider.

Preferably, the control detector is arranged within the shield protecting the gamma radiation generator from the detector unit in such a manner that a portion of the gamma radiation proportional to the generated gamma radiation pulse will reach the control detector. This may advantageously be accomplished by dimensioning the thickness of the wall of the shield in the vicinity of the control detector such that in this area shielding is incomplete.

Furthermore, it has been found to be particularly advantageous to utilize scintillation counters as detectors as they are characterized by a high energetic and temporal resolution. To prevent measuring errors resulting from variations in the voltage supply of the detectors it is preferred to feed both detectors from a source of voltage by way of a voltage divider. Possible measuring errors resulting from variations in the supply voltage will be compensated by the ensuing division of the control measurement signal and the main measurement signal.

Compared to probes which as a source of gamma radiation are provided with a circular electron accelerator, the probe in accordance with the invention has small transverse dimensions and may thus be utilized without any difficulties even in small diameter wellholes.

DESCRIPTION OF THE DRAWING

The novel features which are considered to be characteristic of the invention are set forth with particularity in the appended claims. The invention itself, however, in respect of its structure, construction, and lay-out, as well as manufacturing techniques, together with other objects and advantages thereof will be best understood from the ensuing description of the preferred embodiment, when read in conjunction with the sole appended drawing, which is a schematic view of a probe in accordance with the invention.

DETAILED DESCRIPTION OF THE PREFERRED EMBODIMENT

In the drawing, there is shown a probe for determining the density of the material, such as rock, constituting the wall of a wellhole (not shown). The probe is shown to be made up of a gamma radiation generator 1 and a detector unit 2, the latter being shielded from the former by a lead shield 3.

The essential structural components of the gamma radiation generator 1 are a high voltage charging unit 4, an energy storage 5 including a capacitor 5.1 and a discharge unit 5.2, a Tesla transformer 6, and an electron acceleration unit 9 provided with an anode 7 and a heatable cathode 8. A control electrode 10 is positioned intermediate the anode 7 and the cathode 8. A vacuum pump 11 is positioned above the cathode 8 for providing a vacuum in the range of $10^{-5}$ to $10^{-6}$ mm Hg within the electron accelerator 9.

The detector unit 2 is constituted by a main scintillation counter 12, a control scintillation counter 13 and a high voltage supply 14 for the scintillation counters 12 and 13.

The gamma radiation generator 1 operates in a pulsating manner. Its operation may be described as follows:

The capacitor 5.1 is charged by the high voltage charging unit 4, and when a predetermined state of charge, such as, for instance, 10 kV, has been reached, the capacitor 5.1 is discharged by the discharger 5.2. The high voltage output of the capacitor 5.1 is connected to a primary coil of the Tesla transformer 6. Because of the high $\delta I/\delta t$ occurring when the capacitor 5.1 is discharged, a voltage pulse of about 1 MV is induced in the Tesla transformer. Depending upon the configuration, the duration of this voltage pulse may be in the order of 30 ns to 1,000 ns. This voltage pulse which is effective between the anode 7 and the heated cathode 8 extracts electrons from the heated cathode 8 and accelerates them toward the anode 7 where they impact and where their deceleration results in a gamma radiation pulse. Depending upon the duration of the discharge, the current between cathode 8 and anode 7 may be between 2 and 30A which corresponds to up to $10^{13}$ electrons per discharge. The gamma radiation thereby released may amount to as much as 1,000 mCi. It is, therefore, substantially higher than that of conventional probes of similar dimensions.

The potential at the control electrode 10 is −5 kV, for instance. The control electrode 10 prevents the emission of electrons from the heated cathode 8 until such time as a predetermined desired voltage has been built up between the anode 7 and the heated cathode 8. Also, electrons of low energy are suppressed, and the spectrum of the produced radiation in the higher energy range is increased. The surface of the anode 7 facing the cathode 8 is disposed at an angle of about 45° relative to the longitudinal axis of the probe. In this manner, the major portion of the produced gamma radiation pulse is released in the direction of the wall of the wellhole. If the probe is pressed against the wall of a wellhole, particularly of larger or inhomogeneous wellholes, disturbances resulting from scattering are prevented in the drilling fluid.

The gamma radiation released toward the wall of the wellhole is scattered in the surrounding material, such as, preferably, rock or stone. It is also partially absorbed. Overall, it is reduced in proportion to the density of the material. The main scintillation counter 12 which is shielded from the gamma radiation generator receives the scattered radiation pulse. The control scintillation counter 13 positioned in the lead shield 3 receives only a portion of the directly emitted gamma radiation from the gamma radiation generator 1. The counter 13 is arranged within the lead shield 3 in such that it cannot receive any part of the scattered radiation. The magnitude of the received gamma radiation portion depends upon the thickness of the layer of lead in front of the control scintillation counter 13 in the direction of the gamma radiation generator. With each gamma radiation pulse the control scintillation counter 13 delivers a measurement signal which is proportional to the intensity of the pulse. The measuring signal of the main scintillation counter 12 and of the control scintillation counter 13 are fed to a divider 15. The quotient of the two measurement signals is the variable required to determine the density of the wall material of the wellhole. In the embodiment shown, the divider 15 is positioned outside of the wellhole, but as stated supra, the divider may be mounted in the probe to be an integral part thereof.

On the one hand, by the use of a control scintillation counter 13 variations in the intensity of the gamma radiation produced by the gamma radiation generator 1 are compensated; on the other hand, any external influences to which the entire detector system is exposed, such as, for instance, temperature variations and pressure variation are compensated throughout wide ranges. Scintillation counters behave relatively linearly over wide ranges.

Variations in the supply voltage of the scintillation counters 12 and 13 may be substantially compensated in the arrangement herein described by feeding both counters from a common voltage source. By means of the probe in accordance with the invention, statistical and systematic errors may be detected more easily or they may be compensated directly. Because of the high intensity of the gamma radiation pulse the speed of the measuring process may be enhanced. Also, natural gamma radiation originating from the surrounding material remains substantially without any effect.

What is claimed is:

1. A probe for radiologically determining the density of material constituting the wall of a wellhole, comprising:

means including an impulse electron accelerator for selectively generating gamma radiation;

means for emitting said gamma radiation toward said wall;

means for detecting a portion of said emitted gamma radiation and for producing a first signal representative thereof;

means for detecting a portion of gamma radiation scattered from said wall and for producing a second signal representative thereof;

means for deriving a quotient of said first and second signals.

2. The probe of claim 1, wherein said impulse electron accelerator means comprises axially aligned anode and heatable cathode means.

3. The probe of claim 2, wherein said anode means is provided with discharge face means positioned at an angle of substantially 45° relative to said axis.

4. The probe of claim 3, wherein control electrode means is provided intermediate said anode and cathode means.

5. The probe of claim 2, wherein said gamma radiation generating means further comprises a capacitive energy storage means.

6. The probe of claim 5, further comprising Tesla transformer means comprising a primary coil connected to an output of said capacitive energy storage means and a secondary coil having an output connected to said anode means.

7. The probe of claim 6, wherein said capacitive energy storage means comprises discharge means.

8. The probe of claim 1, wherein said first signal producing means comprises first scintillation counter means.

9. The probe of claim 8, wherein said first scintillation counter means for receiving only a proportional part of emitted radiation is partially shielded from said gamma radiation generating means by a lead shield.

10. The probe of claim 1, wherein said second signal producing means comprises second scintillation counter means.

11. The probe of claim 10, wherein said second scintillation counter means is shielded from said gamma radiation generator to receive scattered radiation.

12. The probe of claim 1, wherein said first and second signal generating means are connected to a common power source.

13. The probe of claim 6, wherein the duration of the output pulse of said Tesla transformer is from about 10 ns to about 1,000 ns.

14. The probe of claim 13, wherein the output pulse of said Tesla transformer means is about 1 MV.

15. The probe of claim 14, wherein the current between said anode and said cathode means is about 2 to about 30 A.

16. The probe of claim 4, wherein the potential of said control electrode is about −5 kV.

17. The probe of claim 1, wherein said gamma radiation generating means comprises vacuum pump means for generating a vacuum pressure of about $10^{-5}$.

* * * * *